(12) United States Patent
Courtney

(10) Patent No.: US 11,383,183 B2
(45) Date of Patent: Jul. 12, 2022

(54) CAP FOR REFILLABLE WATER FILTER

(71) Applicant: Pureflo Limited, Moray (GB)

(72) Inventor: John Courtney, Aberlour (GB)

(73) Assignee: Pureflo Limited, Moray (GB)

( * ) Notice: Subject to any disclaimer, the term of this patent is extended or adjusted under 35 U.S.C. 154(b) by 6 days.

(21) Appl. No.: 16/592,558

(22) Filed: Oct. 3, 2019

(65) Prior Publication Data
US 2020/0114285 A1   Apr. 16, 2020

(30) Foreign Application Priority Data
Oct. 5, 2018 (GB) ...................................... 1816257

(51) Int. Cl.
*B01D 27/08* (2006.01)
*C02F 1/00* (2006.01)

(52) U.S. Cl.
CPC .............. *B01D 27/08* (2013.01); *C02F 1/003* (2013.01); *B01D 2201/295* (2013.01); *B01D 2201/302* (2013.01); *B01D 2201/304* (2013.01); *B01D 2201/4023* (2013.01); *B01D 2201/4084* (2013.01)

(58) Field of Classification Search
CPC .............. B01D 27/08; B01D 2201/295; B01D 2201/302; B01D 2201/304; B01D 2201/4023; B01D 2201/4084; B01D 2201/4053; B01D 2201/305; B01D 35/30; B01D 35/14; B01D 2201/301; B01D 2201/34; B01D 35/02; C02F 1/003; C02F 2201/004; C02F 2307/10; C02F 2201/006
USPC ............. 210/440–444, 455, 470, 19.01, 282, 210/497.01
See application file for complete search history.

(56) References Cited

U.S. PATENT DOCUMENTS

| 4,739,899 A | 4/1988 | Thompson |
| 6,165,303 A | 12/2000 | Darby |
| 2003/0178356 A1 | 9/2003 | Bartkus |
| 2007/0125692 A1* | 6/2007 | Snyder .................... C02F 1/325 210/198.1 |
| 2015/0001140 A1 | 1/2015 | Reckin et al. |

(Continued)

FOREIGN PATENT DOCUMENTS

WO   WO2018000254   1/2018

OTHER PUBLICATIONS

European Patent Office, European search report for Application No. 19201473, dated Oct. 3, 2020, 9 pages.

*Primary Examiner* — Madeline Gonzalez
(74) *Attorney, Agent, or Firm* — Stetina Brunda Garred and Brucker

(57) ABSTRACT

A water filter assembly for filtering water, adapted to be coupled to piping of a piped water system, the water filter apparatus comprising: a housing having first and second housing ends, the housing having an inlet and an outlet located at the first housing end, the second housing end having an opening, the housing being for removably receiving a filter element assembly through the opening in the second housing end, and a housing bottom cover releasably mountable over the opening in the second housing end. Preferably the assembly further comprises a filter head adapted to be coupled to piping of a piped water system and means for removably securing the first housing end to the filter head. Preferably the housing bottom cover is adapted to be secured to the housing via an interference fit.

18 Claims, 11 Drawing Sheets

(56) References Cited

U.S. PATENT DOCUMENTS

2017/0252677 A1   9/2017  Cupit
2017/0304752 A1  10/2017  Nelson et al.

* cited by examiner

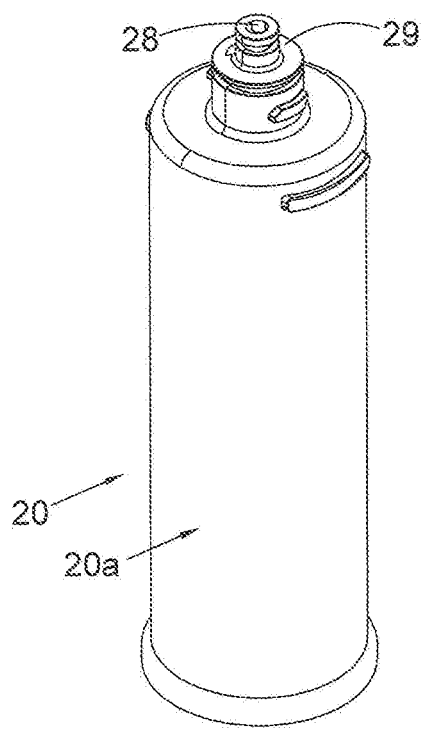
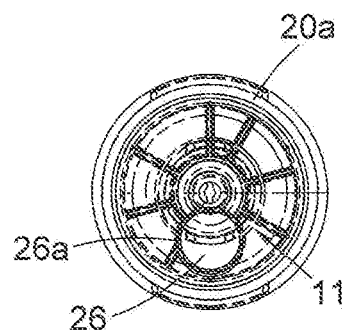
Fig. 1B
Fig. 1A
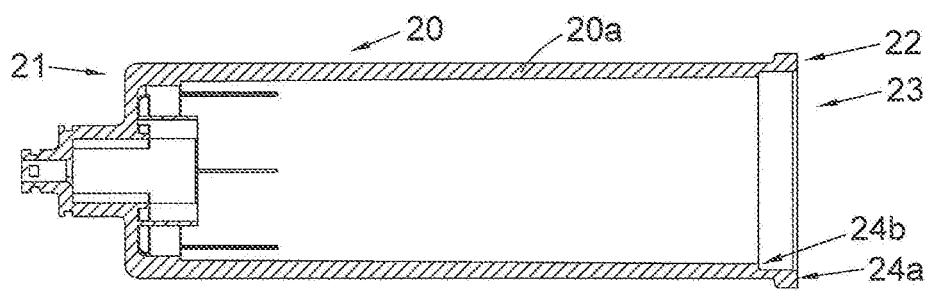
Fig. 1C
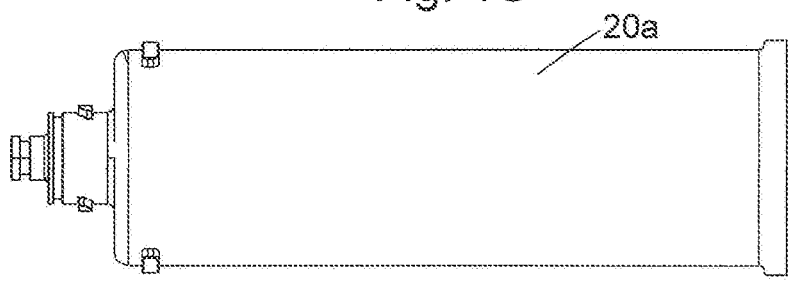
Fig. 1D
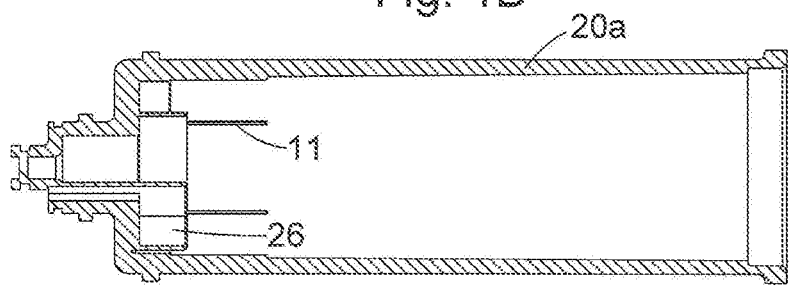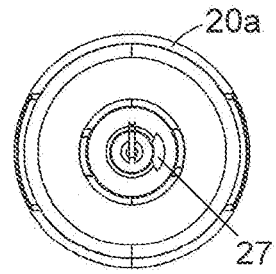
Fig. 1E  Fig. 1F

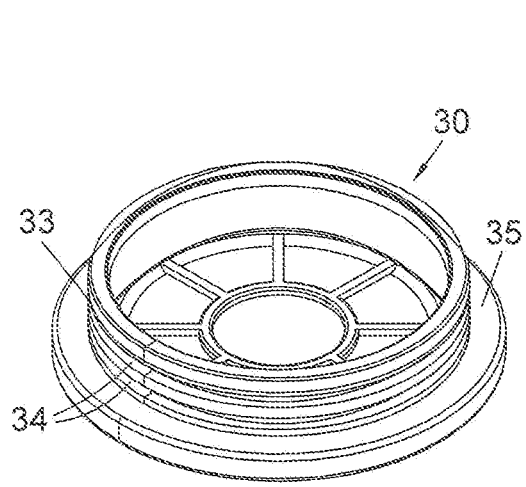
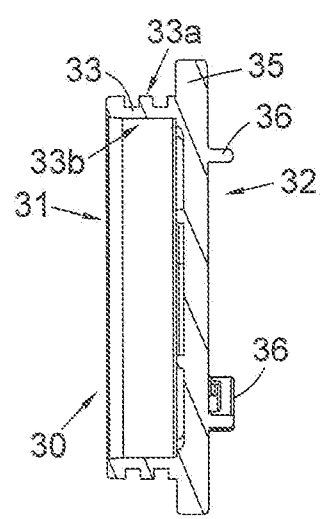
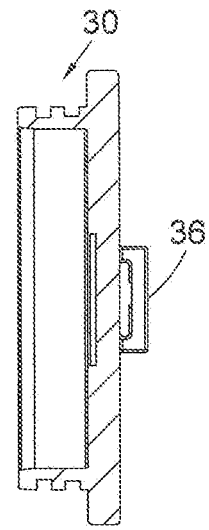
Fig. 3A  Fig. 3B  Fig. 3C
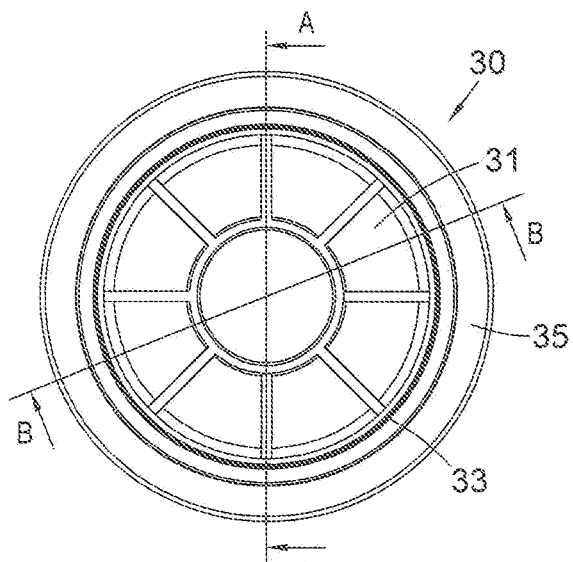
Fig. 3D
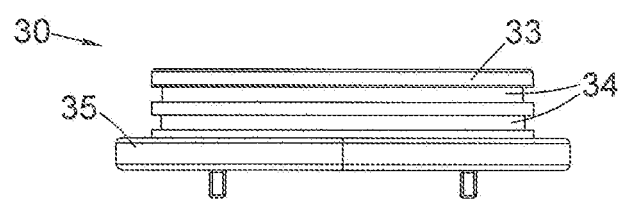
Fig. 3E

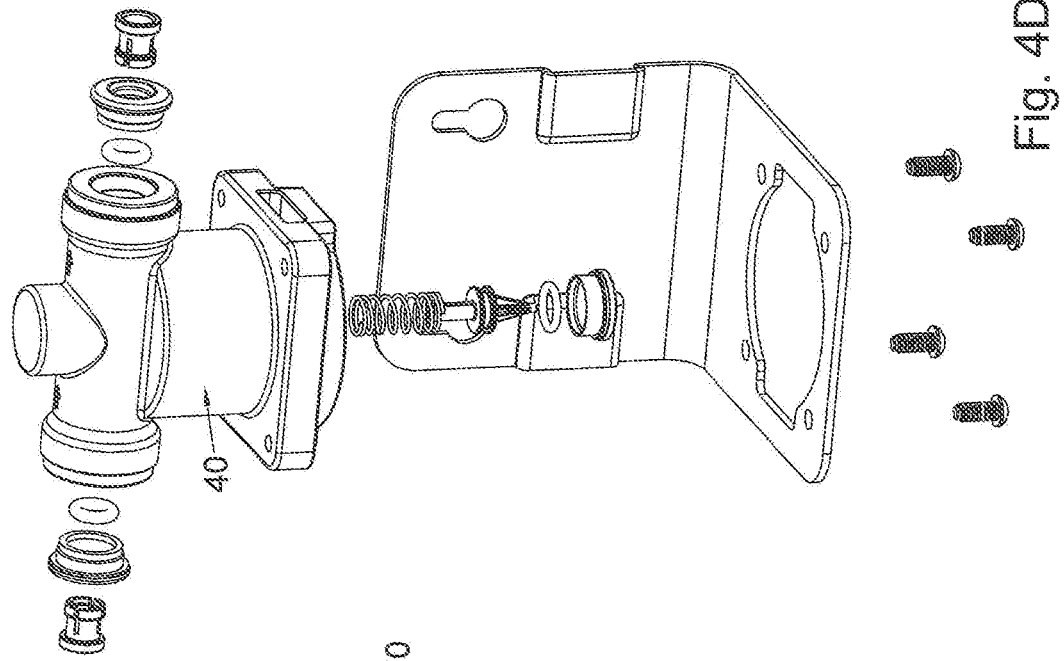
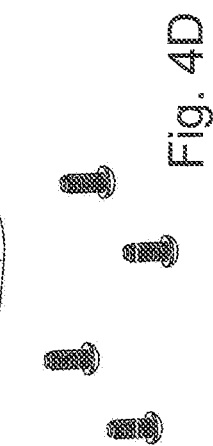
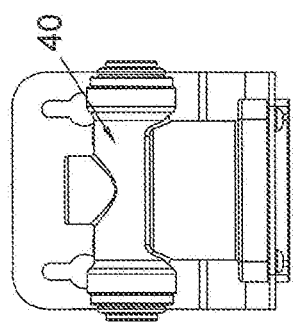
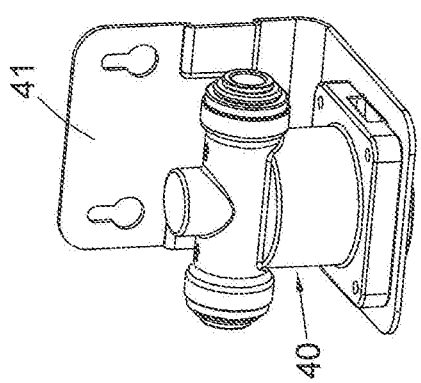
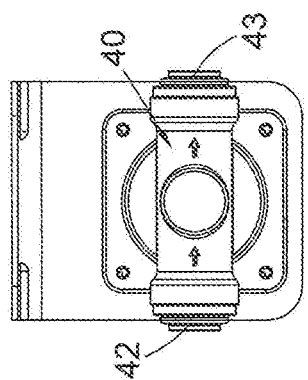

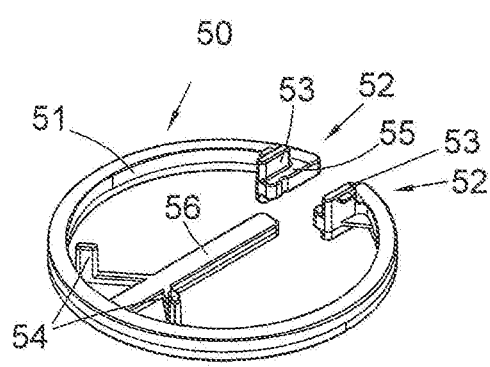
Fig. 5A
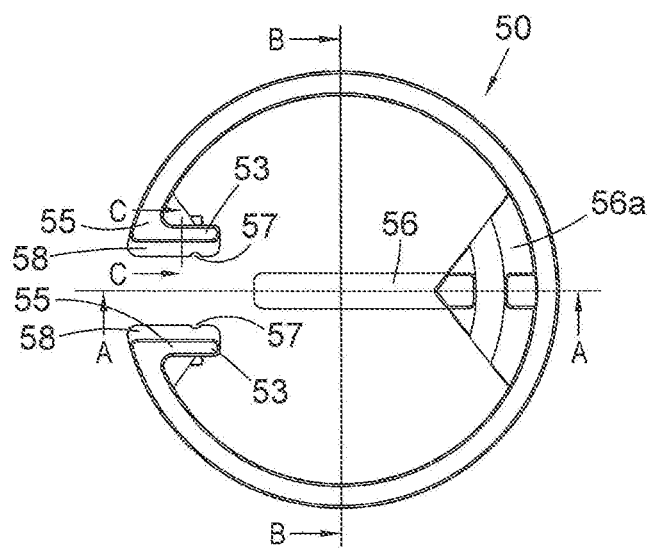
Fig. 5B
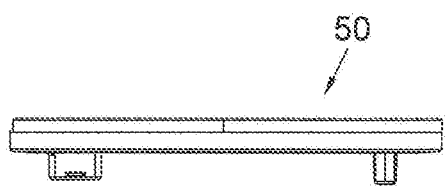
Fig. 5C
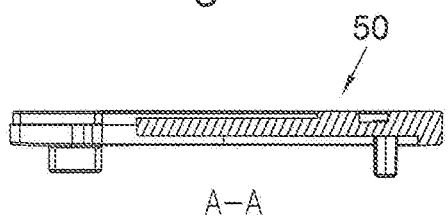
A—A
Fig. 5D
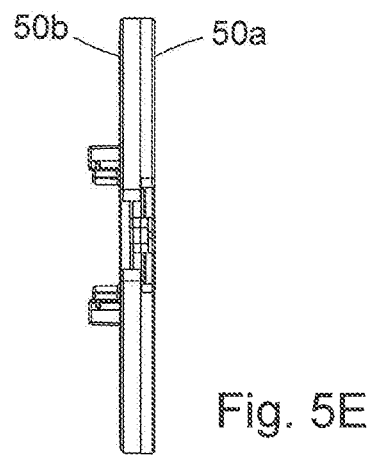
Fig. 5E
Fig. 5F
C—C
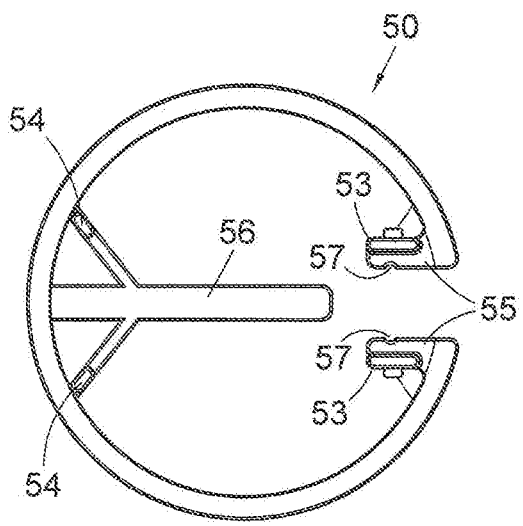
Fig. 5G
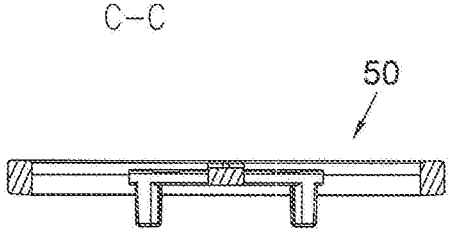
B—B
Fig. 5H

CAP FOR REFILLABLE WATER FILTER

CROSS REFERENCE TO RELATED APPLICATIONS

The present application claims priority to Great Britain Application No. 1816257.8 filed Oct. 5, 2018, the entirety of the disclosure of which is expressly incorporated herein by reference.

STATEMENT RE: FEDERALLY SPONSORED RESEARCH/DEVELOPMENT

Not Applicable.

FIELD OF THE INVENTION

The present invention relates to a water filter assembly for filtering water, adapted to be coupled to piping of a piped water system, for example for providing filtered drinking water from mains tap water/piped water.

BACKGROUND OF THE INVENTION

Water typically contains contaminants, which include particulate matter, chemicals and microorganisms. In drinking water, it is especially desirable to remove the harmful contaminants from the liquids before consuming them for maintenance of good health.

In view of these factors, it is highly important to provide a readily available source of substantially pure water free of harmful and distasteful contaminants to be consumed in working or domestic environments. For the consumer the filtration apparatus should be economical to install and run, compact, and ready to use with minimal intervention and need for maintenance. This is suitably achieved by providing a filtration apparatus that can be fitted to a mains tap water system, suitably in the consumer's premises to filter out some or all of the impurities that the mains water suppliers did not remove, or which entered the water from the distribution pipework. These impurities may be small particles or may even be molecules that adversely affect the taste and odour of the water.

Several different methods are known for purification of water based on which many devices and apparatus have been designed. These methods and devices vary depending on the type of impurities present in water. Many filters use carbon as a filter media, primarily to reduce chlorine from the water from the mains water supply. Usually 'activated' carbon is used, i.e. carbon which has been treated such that it has a slight positive charge. Early activated carbon filters used for home water treatment typically contained granular activated carbon (GAC) comprising a mixture of coarse carbon particles together with a binding material. Now, carbon filter media comprising finer, powdered carbon particles are available, known as powdered activated carbon block. The powdered activated carbon is extruded or moulded, together with a binding material, into a solid carbon block. Carbon block filter elements comprise smaller carbon particles and have a larger surface area to mass ratio than filter elements comprising granular activated carbon, and therefore carbon block filters are more effective at removing smaller sized contaminants.

During filtration, particles become trapped in the porous carbon media, therefore carbon filter elements have a limited lifespan and are required to be replaced frequently.

Domestic water filters for filtering water from the main supply generally comprise a housing with a removable cap in which is mounted a replaceable filter cartridge. The filter cartridge comprises a cylindrical carbon filter element to which is attached a supportive end cap, fastened to one end of the element, to channel water through the filter element. When the filter element is required to be replaced, the removable cap is detached from the housing and the filter cartridge is removed from the housing and replaced with a new filter cartridge. Various improvements can be made to convention water filter assemblies to improve the operation of replacing the filter cartridge.

SUMMARY OF THE INVENTION

According to a first aspect of the invention there is provided a water filter assembly for filtering water, adapted to be coupled to piping of a piped water system, the water filter apparatus comprising:

a housing having first and second housing ends, the housing having an inlet and an outlet located at the first housing end, the second housing end having an opening, the housing being for removably receiving a filter element assembly through the opening in the second housing end, and a housing bottom cover releasably mountable over the opening in the second housing end.

Instead of having an opening at the first housing end for insertion/removal of the filter element assembly as in conventional water filter assemblies, the opening for insertion/removal of the filter element assembly is at the second housing end.

Preferably the assembly further comprises a filter head adapted to be coupled to piping of a piped water system and means for removably securing the first housing end to the filter head.

Preferably the housing bottom cover is adapted to be secured to the housing via an interference fit. An interference may also be known as a press-fit. The bottom cap is preferably connectable to the housing by a connection other than a rotatable connection. The bottom cap is preferably connectable to the housing via a non-threaded connection.

Preferably the housing bottom cover has an inner side and an outer side, the inner side facing the housing when assembled thereto, the housing bottom cover comprising an upstanding skirt extending from its inner side.

Preferably the skirt has an internal side and an external side, the external side of the skirt including at least one groove, said at least one groove being adapted to receive an O-ring seal. The or each O-ring seal is for sealing against the inside wall of the housing.

Preferably the assembly is adapted such that the housing bottom cover has a mounted position wherein the housing bottom cover is sealed against the housing. Preferably the skirt of the housing bottom cover is sealed against a portion of the inner wall of the housing.

Preferably the inner wall of the housing includes an annular step surface at its second end, the housing bottom cover having an outwardly flanged shoulder, the shoulder of the housing bottom cover engaging the annular step surface on the housing when the housing bottom cover is in its mounted position. The housing bottom cover preferably has a handle on its outer side for use in removal of the housing bottom cover from the housing. The handle is preferably U-shaped, having first and second terminal ends. The terminal ends of the handle are preferably pivotally coupled to the housing bottom cover. The handle is preferably shaped to receive a wedge shaped cover removal tool thereunder for use in prying the housing bottom cover from the housing. The assembly may further comprise a wedge shaped cover removal tool. The wedge shaped cover removal tool is preferably elongate, having a substantially planar base and a wedge surface at an incline relative to the base. The wedge surface is preferably has a concavely curved cross-section transverse to its longitudinal axis. The cover removal tool preferably has a narrow end and a thick end at opposite ends of its longitudinal axis. The narrow end of cover removal tool can be received under the handle of the housing bottom cover so that if a pushing force is applied to the cover removal tool at its thick end when the housing bottom cover is in its mounted position, the cover removal tool can be used to pry the housing bottom cover out of its mounted position.

The cover removal tool preferably has a channel extending along its base, substantially parallel with the longitudinal axis of the cover removal tool which is shaped to fasten the cover removal tool to piping of the piped water system. This allows the cover removal tool to be fastened to piping for storage when not in use for removing the housing bottom cover from the housing. The channel preferably has a C shaped cross-sectional shape, the channel having an opening which is smaller in diameter than the channel diameter so that the channel clamps around the piping when fastened thereto. The connection therefore acts like a keder connection, with the piping akin to a keder rod receivable in the channel in the cover removal tool.

Preferably the housing bottom cover has a mounted position wherein it is mounted in sealing engagement over the opening in the second housing end, the assembly further comprises retaining means for retaining the housing bottom cover in its mounted position relative to the housing.

Preferably the retaining means mounts over the housing bottom cover in use so that the housing bottom cover is between the retaining means and the opening in the second housing end when assembled. Preferably the retaining means comprises a circlip. Preferably the circlip is outwardly biased.

Preferably the housing has an inner wall, the inner wall of the housing having an annular groove for receiving the retaining means therein in use.

Preferably the retaining means has an inner side and an outer side, the inner side facing towards the housing when assembled thereto, the retaining means comprising at least one protruding member that extends away from the outer side. The or each at least one protruding member may be a protruding lug. The retaining means preferably has four protruding members. The four protruding members are preferably arranged with a first pair at one side of the circlip and a second pair on the other side of the circlip, diametrically opposite the first pair.

Preferably the retaining means comprising a circlip having two free ends, the circlip having at least two protruding members located one at each free end of the circlip such that they extend away from the outer side of the circlip, the at least two protruding members being arranged such that a user can pinch them to compress the circlip. The two protruding members, one at each free end of the circlip, suitably act like ears that can be pinched to compress the circlip to aid in placing the circlip within the opening at the second end of the housing.

Preferably the retaining means can be mounted relative to the housing in a mounted position to retain the housing bottom cover to the housing, the housing bottom cover having a mounted position wherein it is sealed against the housing, the second end of the housing terminating at a terminal edge, wherein the assembly is adapted so that the housing bottom cover can be placed in the opening in the second end of the housing and the retaining means placed over it with the at least one protruding member extending proud from the terminal edge of the housing such that the housing bottom cover can be driven into its mounted position by pushing the second end of the assembly against a surface, other object or the like. Any suitable flat surface can be used at the bearing surface that the second end of the assembly is pushed against, such as a wall, the floor or a table surface for example.

Preferably the retaining means comprises a circlip having two free ends, the circlip having an expanded configuration in which it is retainable in a mounted position relative to the housing, the assembly further comprising a locking member which is moveable between a locked position and an unlocked position, the locking member being located between the two free ends of the circlip when in its locked position in order to maintain the circlip in its expanded configuration.

Preferably the locking member is slidable into and out of its locked position. The locking member may be configured to be slideable back and forth along a supporting arm. The supporting arm preferably extends parallel to a diameter of the circlip.

Preferably the assembly further comprises at least one detent on one of the locking member or circlip and a corresponding notch in the other of the locking member and circlip, the at least one detent being for cooperatively engaging in the corresponding notch when the locking member is in the locked position. The circlip preferably has a pair of said detents, each with a corresponding notch for engaging with when the locking member is in the locked position in order to retain the locking member in the locked position. The two detents are preferably located on the locking member, on opposing sides of the locking member so that each detent faces a corresponding notch on each of the free ends of the circlip when the locking member is in its locked position.

Preferably the water filter assembly further comprises a filter element assembly, the filter element assembly being removably insertable in the housing through the opening in the second housing end, the filter element assembly comprising a water filter element for filtering water.

Preferably the filter element assembly comprises a proximal end to be arranged at the first end of the housing and a distal end to be arranged at the second end of the housing when installed, the filter element assembly further comprising a proximal end mount which, in use, channels water through the filter element, the proximal end mount having a spigot projecting from it, the housing having a spigot recess inside the housing at its first end for receiving the spigot therein, the spigot recess having an aperture therein which comprises the housing inlet or the housing outlet so that the spigot can be coupled in fluidic communication with the housing inlet or outlet.

Preferably the filter element has a substantially cylindrical outer shape, the filter element having a central longitudinal axis, the spigot projecting along an axis that is offset from the central longitudinal axis of the filter element.

Preferably at least part of the housing is cylindrical in shape, the housing having a central longitudinal axis, the spigot recess in the housing being offset from the central longitudinal axis of the water filter assembly.

Preferably the housing has a chamber, the chamber having an end wall at its first end, the spigot recess being located in the end wall and comprising a spigot recess wall extending away from the end wall. The spigot recess wall is preferably shaped so that a seal is formed between the spigot and spigot recess when the components are assembled.

Preferably the housing further comprises spacer means extending away from its end wall by a distance substantially matching that of the spigot recess wall, the spacer means being adapted to prevent the spigot from reaching the end wall when being installed except via the spigot recess. The spacer means avoids blocking water from entering/exiting the filter element from its sides and provides an autolocation feature that assists the spigot to autolocate in the spigot recess whilst the filter element assembly is being installed in the housing.

Preferably the spacer means comprises a ridge, the ridge being substantially C-shaped and having first and second ends, the spigot recess being located between the first and second ends of the ridge. The C-shaped ridge is preferably substantially concentric with the central longitudinal axis of the housing.

Preferably the filter element assembly comprises a proximal end to be arranged at the first end of the housing and a distal end to be arranged at the second end of the housing when installed, the filter element assembly further comprising a distal end mount mounted on the distal end of the filter element, the distal end mount having an outer side facing away from the filter element, the distal end mount having a projecting member extending from the outer side of the distal end mount. The projecting member is for use when removing the filter element assembly from the housing.

Preferably the projecting member has an undercut into which a filter element assembly removal tool may be engaged in order to pull out the filter element assembly from the housing. The projecting member is preferably circular in shape and the undercut is preferably an annular undercut extending around the projecting member.

According to a further aspect of the invention there is provided a filter element assembly for a water filter apparatus according to any aspect of the invention as described above.

Preferably the filter element assembly comprises a filter element, the filter element assembly having a proximal end to be arranged at the first end of the housing and a distal end to be arranged at the second end of the housing when installed, the filter element assembly further comprising a proximal end mount which, in use, channels water through the filter element, the first end mount having a spigot projecting from it, wherein the filter element has a substantially cylindrical outer shape, the filter element having a central longitudinal axis, the spigot projecting along an axis that is offset from the central longitudinal axis of the filter element. Preferably the spigot is located such that it can be received in a corresponding spigot receiving recess in the housing. The filter element assembly is suitably a replaceable filter element assembly.

According to a further aspect of the invention there is provided a method of filtering water using a water filter assembly according to any aspect of the invention as described above, the method comprising coupling the water filter assembly to a piped water system and channeling water through the water filter assembly.

Preferably, the method further comprises the steps of inserting the filter element assembly through the opening in the second end of the housing, locating the spigot in the spigot recess, mounting the housing bottom cover over said opening. Preferably the housing bottom cover is press-fit into a mounted position. This may be done by placing the retaining means over the housing bottom cover, with the at least one protruding member extending proud from the terminal edge of the housing and pushing the second end of the assembly against a housing to drive the housing bottom cover into its mounted position. Optionally the locking member may then be moved into its locked position in order to retain the retaining member in its retaining position.

The present invention may further provide a method of removing a filter element assembly from a water filter assembly as described above, the method comprising using the handle to remove the housing bottom cover from its mounted position in the housing and pulling the filter element assembly from the housing. The cover removal tool may be used to remove the housing bottom cover. The filter element assembly removal tool may be used to pull out the filter element assembly from the housing.

References herein to mounting of any first element to any second element encompass direct or indirect mounting (e.g. the mounting of the first element to a third element which is mounted to the second element). References to mounting a first item to any second item herein include location on any part of the second item, for example location on an internal part of the second item (i.e. location in the second item).

BRIEF DESCRIPTION OF THE DRAWINGS

A preferred embodiment of the present invention will now be more particularly described, by way of example, with reference to the accompanying drawings, wherein:

FIG. 1A shows a perspective view of the hollow body portion of the housing;

FIG. 1B shows a cross-sectional view of the hollow body portion of the housing along a plane perpendicular to the longitudinal axis of the and near to the first end of the housing;

FIG. 1C shows a cross-sectional view of the hollow body portion of the housing along a plane A-A marked on FIG. 1F;

FIG. 1D shows a side view of the hollow body portion of the housing;

FIG. 1E shows a cross-sectional view of the hollow body portion of the housing along a plane B-B marked on FIG. 1F;

FIG. 1F shows a top view of the hollow body portion of the housing;

FIG. 3A shows a perspective view of the housing bottom cover;

FIG. 3B shows a cross-sectional view of the housing bottom cover along plane B-B of FIG. 3D;

FIG. 3C shows a cross-sectional view of the housing bottom cover along plane A-A of FIG. 3D;

FIG. 3D shows a top view of the housing bottom cover;

FIG. 3E shows a side view of the housing bottom cover;

FIG. 4A shows a perspective view of the filter head unit;

FIG. 4B shows a top view of the filter head unit;

FIG. 4C shows a side view of the filter head unit;

FIG. 4D shows an exploded view of the filter head unit;

FIG. 5A shows a perspective view of the circlip of the retaining means;

FIG. 5B shows a bottom view of the circlip;

FIG. 5C shows a side view of the circlip;

FIG. 5D shows a cross-sectional view of the circlip along plane A-A of FIG. 5B;

FIG. 5E shows a further side view of the circlip;

FIG. 5F shows a cross-sectional view of the circlip along plane C-C of FIG. 5B;

FIG. 5G shows a top view of the circlip;

FIG. 5H shows a cross-sectional view of the circlip along plane B-B of FIG. 5B;

DESCRIPTION OF THE PREFERRED EMBODIMENT

Figure 2B:
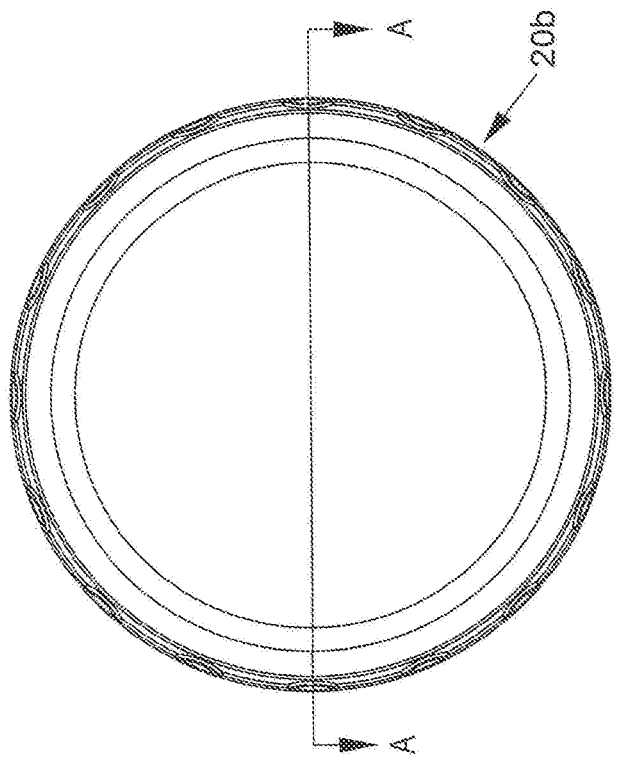
FIG. 2B shows a top view of the housing base portion.

The present embodiments represent currently the best ways known to the applicant of putting the invention into practice. But they are not the only ways in which this can be achieved. They are illustrated, and they will now be described, by way of example only.

A preferred embodiment of a water filter assembly according to the invention will now be described with reference to the figures. The water filter assembly comprises a housing defining a chamber for receiving a removable filter element assembly, the assembly being adapted to be coupled to piping of a piped water system.

Referring to FIGS. 1A-1F, the housing 20 will be described. The housing 20 comprises a substantially cylindrical, hollow body portion 20a made of a thermoplastics material. The housing 20, which may alternatively be referred to as a sump, houses the filter element assembly in use. The housing 20 has a first housing end 21 in which is located an inlet and an outlet for coupling, via a filter head, to piping of a piped water system. At the opposite end of the elongate housing is a second housing end 22. At the second end 22 of the housing there is a housing base portion 20b shown in FIGS. 2A-2D. The housing base portion 20b is preferably overmoulded onto the housing body portion 20a during manufacture to provide a cylindrical housing 20 with integral base portion 20b at its second end 22. The housing 20 preferably has a circular cross-section.

Instead of having an opening at the first housing end 21 for insertion/removal of the filter element assembly as in conventional water filter assemblies, the housing 20 has an opening 23 at its second housing end 22, remote from the water inlet and outlet, for insertion/removal of the filter element assembly. The filter element assembly can be inserted/removed via the opening 23 formed by corresponding openings in the housing base portion 20b and housing body portion 20a. The assembly further comprises a housing bottom cover 30, shown in FIGS. 3A-3D for releasably mounting over the opening 23 in the second housing end 22 in order to sealably close the housing chamber.

The housing 20 removably fastens to a filter head unit 40, as shown in FIGS. 4A-4D. The filter head unit 40 is configured to mount to a wall or other support surface via a bracket 41 (or other suitable mounting means could be used). The filter head unit 40 has an inlet 42 and an outlet 43 which are adapted for coupling to inlet piping and outlet piping of a piped water system respectively. When the housing 20 is installed in connection with the filter head unit 40, the filter head unit 40 will be in fluid communication with a filter element assembly installed inside the housing 20. In use water may be directed into the housing 20 via the filter head unit 40. The housing 20 is configured to allow quick release and installation of the housing from and to the filter head unit 40.

The housing bottom cover 30 and its connection to the housing 20 will now be described with reference to FIGS. 1A-3D. Referring to FIG. 3A, the housing bottom cover 30 is adapted to be secured to the housing 20 via an interference fit such that it can be press-fit to the housing 20. The housing bottom cover 30 has an inner side 31 that faces the housing 20 when assembled and an outer side 32 opposing the inner side 31. A skirt 33 is upstanding from the inner side 31, the skirt 33 being in the form of an annular wall which projects substantially orthogonally from the plane of the housing bottom cover 30. The skirt 33 has an external side 33a which faces outwardly and an internal side 33b, the skirt having first and second grooves 34 in its external side 33a, each groove 34 being for receiving an O-ring seal therein (not shown). The O-ring seals sandwich against the inside wall of the housing 20 when the housing bottom cover 30 is mounted to the housing 20. There need only be one O-ring seal, or there may be more than two O-ring seals, or other sealing means may be employed. The outer diameter of skirt 33 and the inside wall of the housing 20 at the location where the housing bottom cover 30 is received are dimensioned to provide a strong interference fit when the housing bottom cover 30 is in a mounted position relative to the housing. The internal diameter of the skirt 33 is dimensioned to receive the end of the filter element, to support the filter element assembly when it is housed in the housing 20. The skirt 33 has straight walls in this embodiment and the portion of the housing that receives it is similarly straight-walled, although it will be appreciated that the skirt 33 may be tapered. The sealing of the housing bottom cover 30 to the housing 20 forms a liquid tight seal for the housing.

The housing bottom cover 30 has an outwardly flanged shoulder portion 35 that extends radially out from the base of the skirt 34. Referring to FIG. 1C, the housing 20 has a corresponding annular step surface 24a (formed by a surface at the second end of the housing body portion 20a) which the shoulder portion 35 of the housing bottom cover 30 engages against when in its mounted position. The housing 20 also has a further annular step surface 24b which the end of the skirt 33 furthest from the shoulder portion 35 engages against when the housing bottom cover 30 is in its mounted position, the outer perimeter of the skirt 33 being received within the housing 20 via a tight interference fit when in its mounted position.

Figure 2D:
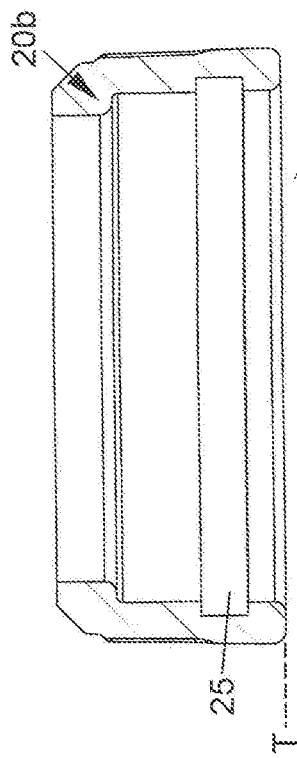
FIG. 2D shows a cross-sectional view of the housing base portion along plane A-A of FIG. 2B.
Figure 2A:
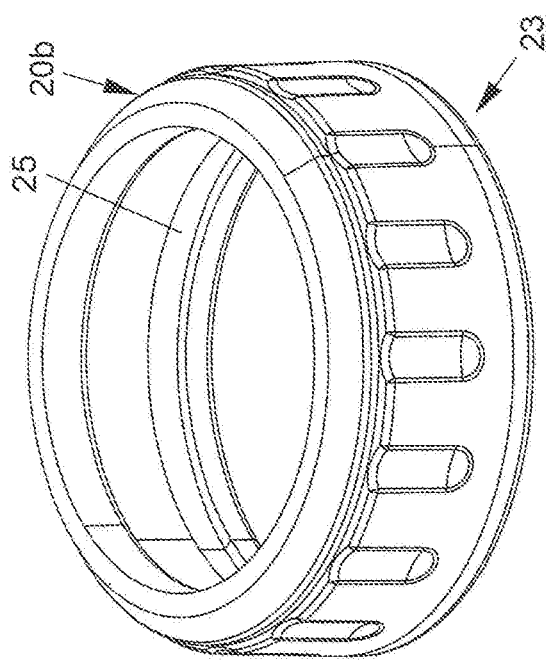
FIG. 2A shows a perspective view of the housing base portion, which is attached to the housing body portion during manufacture of the housing.
Figure 2C:
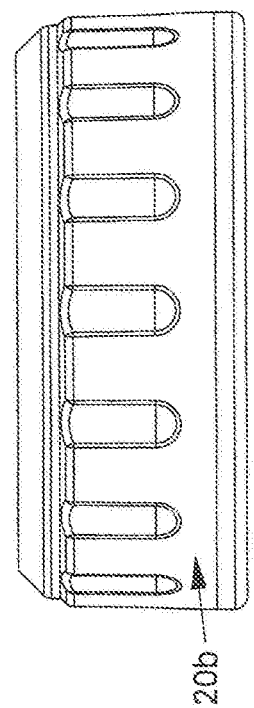
FIG. 2C shows a side view of the housing base portion.

The water filter assembly further comprises retaining means 50, as shown in FIGS. 5A-6E for retaining the housing bottom cover 30 in its mounted position in use on the housing 20. The retaining means 50 mounts over the housing bottom cover 30 in use to hold the housing bottom cover 30 against the housing 20. In this embodiment the retaining means 50 is a circlip device as shown in FIGS. 5A-5H, although other types of retaining means may be employed. Circlips, also known as retaining rings, snap rings, C-clips, pinch clamps, are rings of resilient material, formed in a C-shape with two free ends, which provide some form of retaining action for the assembly it is mounted in. The circlip 50 is outwardly biased toward an expanded configuration and adapted to be received in an annular groove 25, just inside the bottom opening 23 of the housing base portion 20b, as shown in FIG. 2D, when the circlip is in its expanded configuration. When the circlip 50 is in this retaining position relative to the housing, the circlip 50 butts up against the housing bottom cover 30 and acts to block the housing bottom cover 30 from detaching from the housing 20, therefore retaining the housing bottom cover 30 in its mounted position.

The circlip 50 has a C-shaped body portion 51 terminating in two free ends 52. When in its retaining position in the groove 25, with the housing bottom cover 30 also in its mounted position, the body portion 51 of the circlip 50 protrudes radially from the groove and overhangs the edge of the housing bottom cover 30. Referring to FIG. 5E, the circlip 50 has an inner side 50a that faces towards the housing chamber when assembled and an outer side 50b opposing the inner side. Extending from the outer side 50b are a plurality of protruding members 53, 54. Preferably there is one or more protruding members, and in this embodiment there are four protruding members 53, 54. At each free end 52 of the circlip body 51 is an end-piece 55, which extends towards the inside of the circle of the circlip 50 in the plane of the circlip body portion 51. A first pair of the protruding members 53 are located, one at each free end 52 of the circlip body portion 51, each protruding member 53 being located on a corresponding end-piece 55. The first pair of protruding members 53 are therefore like ears that can be pinched by a user to compress the circlip 50 to aid in placing the circlip within the opening at the second end 22 of the housing 20.

A second pair of protruding members 54 is located on the other side of the circlip 50, roughly diametrically opposite the first pair 53. The circlip 50 has a cantilever rod or beam 56 extending from the body portion 51, roughly diametrically opposite from the opening in the body portion 51, the rod 56 having a widened support portion 56a at its proximal end where it meets the C-shaped body portion 51, the second pair of protruding members 54 extending from the support portion 56a and being spaced apart from one another. The arrangement of the four protruding members 53, 54 provides a set of feet which extend from the circlip 50, the protruding members 53, 54, each forming a corner of rectangular or other quadrilateral shape.

The protruding members 53, 54 aid in push-fitting the housing bottom cover 30 into its mounted position, as will now be described. The second end 22 of the housing has a terminal edge (plane T shown in FIG. 2D). When the circlip 50 is in its retaining position, housed in groove 25, the protruding members 53, 54 are all flush with, or within, the terminal edge T of the housing 20. The interference fit between the housing bottom cover 30 and the housing 20 is strong, such that it may be difficult for a user to install the housing bottom cover into its mounted position by simply pushing the housing bottom cover 30 onto the housing 20. In operation in order to install the housing bottom cover 30 in its mounted position, the user places the housing bottom cover 30 in the opening 23 in the second end 22 of the housing 20 so that it rests in the opening, slightly outwardly from its mounted position. The circlip 50 is then placed in the opening 23 by pinching the first pair of protruding members 53 and placing the circlip slightly outwardly from its retaining position. When the assembly is in this installation configuration, the protruding members 53, 54 extend proud from the terminal edge T of the housing 20. By gripping the housing body portion 20a and pushing the second end 22 of the housing orthogonally against a substantially flat surface, such as a wall, the floor or a table, the bearing of the protruding members 53, 54 against the surface in turn pushes the circlip 50 towards the housing 20 and thereby drives the housing bottom cover 30 into its mounted position, overcoming the resistance of the strong interference fit.

The housing bottom cover 30 has a handle 37 on its outer side 32 for use in removal of the housing bottom cover 30 from the housing 20. The housing bottom cover 30 has a pair of anchored rings or chocks 36 on its outer side 32. The handle is a U-shaped handle, preferably made of thick gauge wire, having first and second hooked ends 37a that are pivotally coupled to the housing bottom cover 30 by means of each hooked end hooking under one of the chocks 36 to pivotally anchor the handle to the housing bottom cover 30.

Figure 7A:
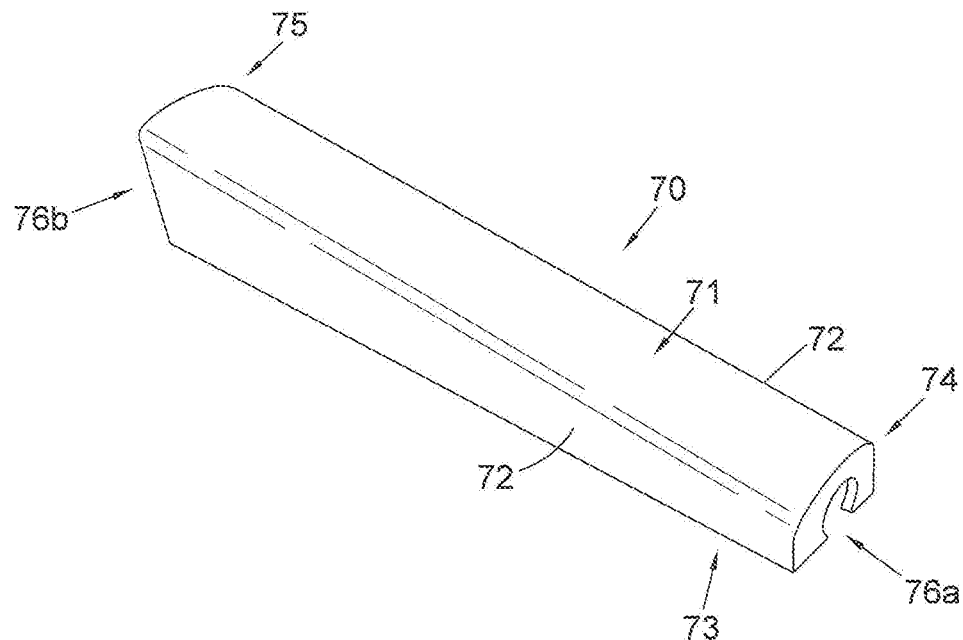
FIG. 7A shows a perspective view of the upper side of the removal tool.
Figure 7B:
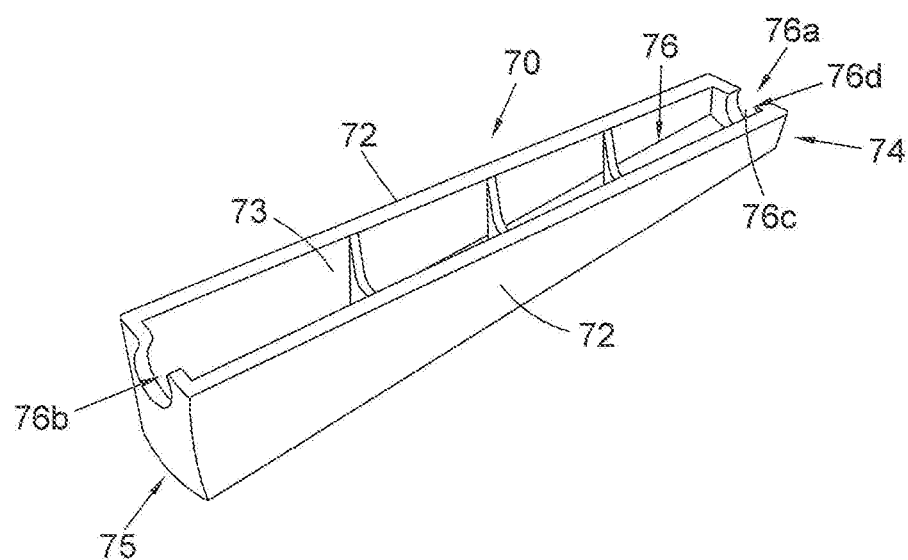
FIG. 7B shows a perspective view of the under side of the removal tool.

The assembly further comprises a wedge shaped removal tool 70 as shown in FIGS. 7A and 7B. The removal tool 70 is elongate and wedge shaped, having a wedge surface 71 and sides 72 that extend away from the wedge surface 71 and which terminate to form a substantially planar base 73. In this embodiment the removal tool 70 is hollow and the planar base 73 is open, however the base 73 may be other than open, e.g. a closed base. The wedge surface 71 is at an incline relative to the base 73. The wedge surface 71 preferably has a concavely curved cross-section transverse to the longitudinal axis of the removal tool 70. The removal tool 70 preferably has a narrow end 74 and a thick end 75 at opposite ends of its longitudinal axis with the incline of the wedge running between. The narrow end 74 of the removal tool 70 can be received under the handle of the housing bottom cover 30 so that if a pushing force is applied to the removal tool at its thick end 75, when the housing bottom cover 30 is in its mounted position, the removal tool can be used to pry the housing bottom cover 30 out of its mounted position. A strong user may be able to remove the housing bottom cover 30 when it is in its mounted position by simply pulling the handle. However the removal tool 70 provides a mechanical advantage and reduces the force required to remove the housing bottom cover 30 to overcome the strong interference fit by means of the inclined wedge surface 71.

The removal tool 70 preferably has an elongate channel 76 extending along its base 73, substantially parallel with the longitudinal axis of the removal tool 70 which is configured to fasten the removal tool 70 to piping (not shown) of the piped water system. This allows the removal tool 70 to be fastened to piping for storage when not in use for removing the housing bottom cover 30 from the housing 20. The channel 76 is defined by a C-shaped first channel end 76a and a C-shaped second channel end 76b. The opening in the C-shaped channel ends 76a, 76b is smaller in diameter than the channel diameter so that each channel opening in the channel ends clamps around the piping when fastened thereto. The channel may have a C-shaped cross-sectional shape, along its full length, in which case the channel may act like a keder connection, with the piping akin to a keder rod receivable in the channel 76 in the removal tool. Alternatively, the channel may have a cross-sectional shape that is much larger in size than the piping that the tool is to be fastenable to; in that case, the tool releasably fastens to the piping by means of the channel ends 76a, 76b being sized and shaped to clamp to the piping, the tool will be releasably fastenable to the piping.

Referring to FIGS. 6A to 6E, the retaining means 50 further comprises a locking member 60 which is moveable between an unlocked position and a locked position in which it maintains the circlip in an expanded configuration. The locking member 60 is tubular buckle having an elongate passageway 61 passing through it. The locking member 60 is slidably mounted in use on beam 56 (visible in FIGS. 5A, 5B and 5G) of the circlip 50 by means of the beam 56 being received in passageway 61 so that the locking member is slidable back and forth along beam 56. The passageway 61 is sized and shaped to receive the beam 56 therein. In this embodiment the beam 56 has a rectangular cross-section and the passageway 61 has a corresponding cross-sectional shape, however the cross-sections of the beam 56 and passageway 61 may be other shapes.

The locking member 60 has first and second opposing sides 62 extending orthogonally to the plane of the circlip 50 and parallel with the axis of the beam 56. A detent 63 is located on each of the first and second opposing sides 62. Each detent 63 is adapted to cooperatively engage in a corresponding notch 57 in the adjacent end-piece 55 of the circlip when the locking member 60 is in its locked position. The location of each detent 63 in a corresponding notch 57 retains the locking member 60 in its locked position unless sufficient force is imparted to the locking member 60 (e.g. by the user) to move the detents 63 out of the notches 57.

Figure 6A:
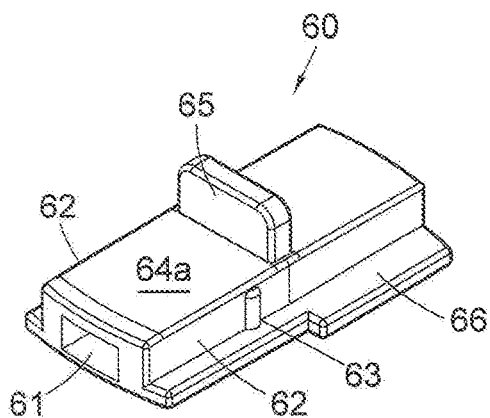
FIG. 6A shows a perspective view of the buckle of the retaining means.
Figure 6B:
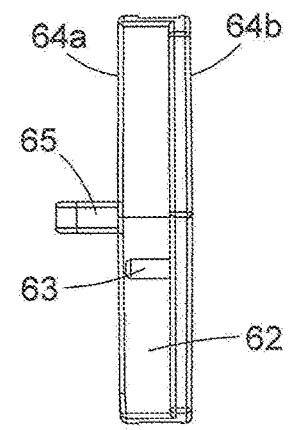
FIG. 6B shows a side view of the buckle.
Figure 6C:
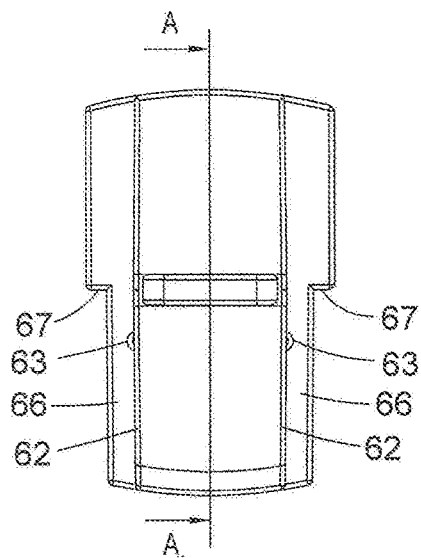
FIG. 6C shows a top view of the buckle.
Figure 6D:
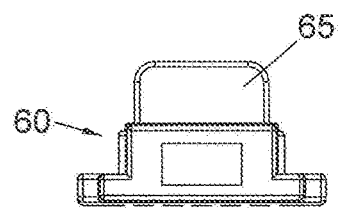
FIG. 6D shows an end view of the buckle.
Figure 6E:
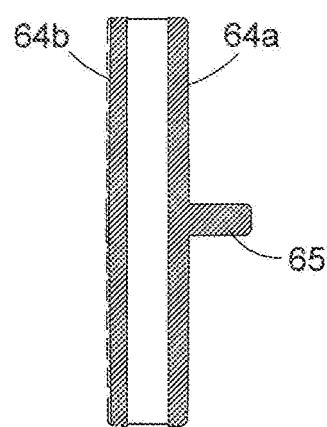
FIG. 6E shows a cross-sectional view of the buckle along plane A-A shown in FIG. 6C.

The locking member 60 has an outer side 64a that faces away from the housing when assembled to the housing and an inner side 64b opposing the outer side. A grip 65 is upstanding from the outer side 64a to be gripped by the user when moving the locking member 60 in and out of its locked position. An outward facing shelf 66 extends laterally from each of the first side and second sides 62. Each shelf 66 is adapted to engage a corresponding inward facing shelf 58 on the corresponding end-piece 55 of the circlip (visible in FIG. 5B). In this way the outward facing shelf 66 engages the inward facing shelf 58 on each side of the locking member 60 to guide the locking member into and out of its locked position. Referring to FIG. 6C, each shelf 66 on the locking member 60 includes a stop 67 that engages with part of the corresponding end-piece 55 when the locking member 60 is in the locked position to prevent the locking member 60 from sliding beyond the locked position.

The distance between the first and second sides 62 of the locking member 60 is such that the locking member forces the end-pieces 55 of the circlip apart when the locking member 60 is in its locked position, thus maintaining the circlip 50 in an expanded configuration. When the circlip is locked in its expanded configuration by locking member 60, the circlip is sized to be retained in groove 25 in the housing. The locking member 60 therefore acts to lock the circlip 50 in its retaining position, thus blocking the housing bottom cover 30 from becoming disengaged from the housing 20.

Figure 8A:
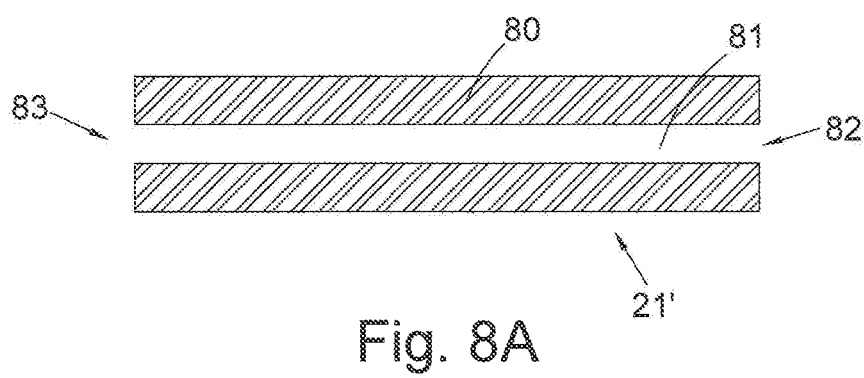
FIG. 8A shows a cross-sectional view of the carbon block.
Figure 8B:
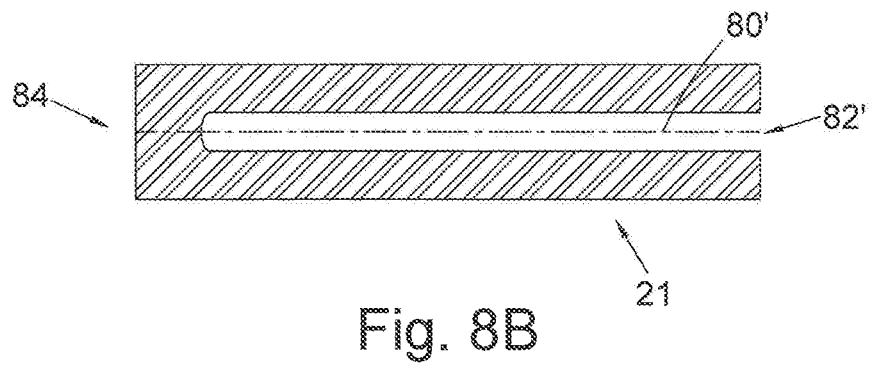
FIG. 8B shows a cross-sectional view of a carbon block of an alternative embodiment.
Figure 9A:
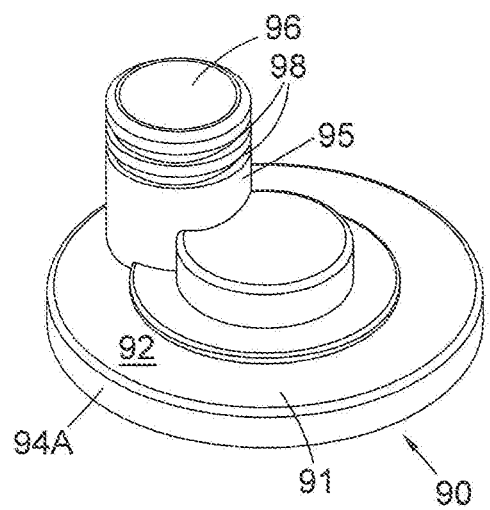
FIG. 9A shows a perspective view of the proximal end mount.
Figure 9B:
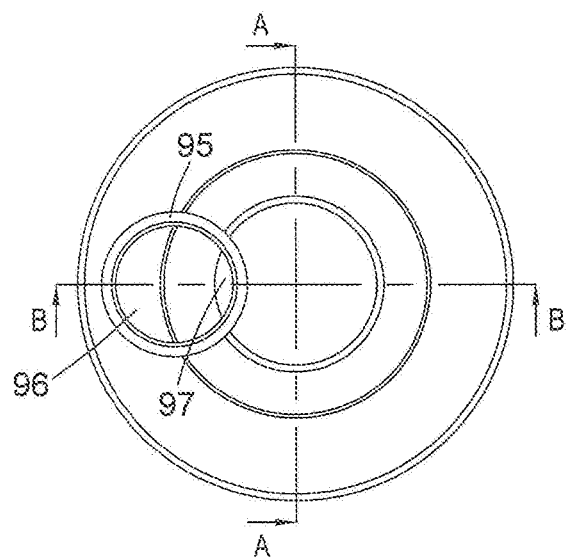
FIG. 9B shows a top view of the proximal end mount.
Figure 9C:
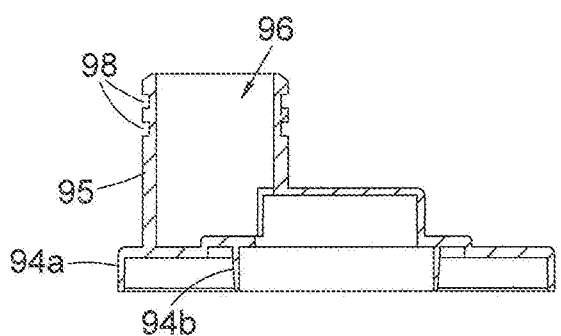
FIG. 9C shows a cross-sectional view of the proximal end mount along plane B-B shown in FIG. 9B.
Figure 9D:
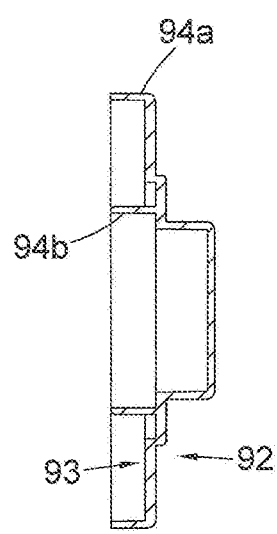
FIG. 9D shows a cross-sectional view of the proximal end mount along plane A-A shown in FIG. 9B.

The filter element assembly that is removably housed within housing 20 in use will now be described with reference to FIGS. 8 to 10. The filter element assembly comprises a filter element 80, a proximal end mount 90 and a distal end mount 100, as will be further described. The filter element is a carbon block filter element, as shown in FIG. 8A. The carbon block 80 has a cylindrical bore 81. The bore 81 has two opposing open ends 82, 83. In alternative embodiments as shown in FIG. 8B the carbon block 80' may have one open end 82' and a closed end 84. The carbon block is made of high grade carbon such as activated carbon. It will typically be formed by moulding powdered carbon.

Referring to FIG. 8A, one of the ends of the carbon block 80 is a proximal end to be located at the first end 21 of the housing 20 and the other end is a distal end to be located at the second housing end 22 when installed therein. The filter element assembly further comprises a proximal end mount 90 as shown in FIGS. 9A to 9D, which channels water through the filter element in use. The proximal end mount 90 comprises a circular plate portion 91 having a top face 92 for facing away from the carbon block 80 and an opposing bottom face 93. Projecting from the outer perimeter of the bottom face 93 is an outer annular wall 94a that fits around the proximal end of the carbon block 80. Also projecting from the bottom face 93 is an inner annular wall 94b that is configured to be received within the opening of the proximal open end 82 of the carbon block's bore.

Projecting from the top face 92 of the proximal end mount 90 is a spigot 95, which is substantially cylindrical in shape. The spigot 95 has a throughbore 96 that communicates with an aperture 97 at its base in the circular plate portion 91 of the proximal end mount. The filter element assembly has a central longitudinal axis running along the centre of bore 81 of the carbon block. The spigot 95 projects along an axis that is offset from the central longitudinal axis of the filter element assembly. When the filter element assembly is installed in the housing 20, the spigot 95 is received in a substantially cylindrical spigot recess 26 in the housing 20, visible in FIGS. 1B and 1E. The spigot recess 26 is similarly offset from the central longitudinal axis of the housing. The spigot recess communicates with aperture 27 (see FIG. 1F) in the first housing end 21, which is an outlet that communicates with the outlet of the filter head unit 40 when coupled thereto. The spigot 95 has first and second grooves 98 in its external side, each groove 98 being for receiving an O-ring seal therein (not shown). The O-rings seal against the internal side of the spigot recess 26 in the housing when the filter element assembly is installed in the housing 20.

During operation of the water filter assembly to filter water, water is directed via the filter head unit 40 into an inlet 28 in a head portion 29 at the first housing end 21 (see FIG. 1A). Water is channeled through the inside of the head portion 29, then hits the circular plate portion 91 of the proximal end mount 90, at which point the water is forced laterally outwards to the sides of the housing 20 and then into the carbon block 80 via its outer side. The water then exits the carbon block via the bore 81, passes through aperture 97 in the proximal end mount 90 and then is channeled through the spigot 95, through aperture 27 in the first housing end 21, into the filter head unit 40 and exits through its outlet 43.

Referring to FIG. 1B, the spigot recess 26 in the housing 20 comprises a circular spigot recess wall 26a that extends away from the internal end wall of the first housing end 21. The diameter of the spigot recess wall 26a is sized so that a seal is formed between the O-ring seals on the spigot 95 and the spigot recess wall 26a when the filter element assembly is installed in the housing.

Referring to FIGS. 1B and 1E, the housing 20 further comprises a spacer means 11 extending away from the internal end wall of the first housing end. The spacer means 11 extends away from the end wall by a distance substantially matching that of the spigot recess wall, so as to prevent the spigot 95 from reaching the end wall except via the spigot recess 26. This provides an autolocation feature that assists the spigot 95 to locate in the offset spigot recess 26. The spacer means 11 comprises a substantially C-shaped ridge having first and second ends, the spigot recess 26 being located between the first and second ends of the ridge. The C-shaped ridge is substantially concentric with the central longitudinal axis of the housing 20. Preferably the C-shaped ridge comprises a portion of a circle. The spigot recess 26 has a central longitudinal axis which is located at or near a notional point on the notional circular perimeter of the C-shaped ridge between the first and second ends of the ridge.

A user can autolocate the spigot 95 in the spigot recess 26, and therefore align the aperture 27 in the spigot recess with an aperture 97 in the proximal end mount 90 of the filter element assembly, by inserting the filter element assembly in the housing, proximal end first 90, then rotating the filter element assembly until the spigot 95 aligns with the spigot recess 26. As the filter element assembly 90 is being rotated but before the spigot 95 is aligned with the spigot recess 26, the spigot will simply abut the spacer means 11, and therefore the filter element assembly cannot be fully inserted in the housing until the spigot 95 is inserted in the spigot recess 26. Once the spigot 95 aligns with the spigot recess 26 the filter element assembly 90 can be inserted further towards the first housing end 21 until the spigot 95 is fully inserted in the spigot recess 26.

Figure 10A:
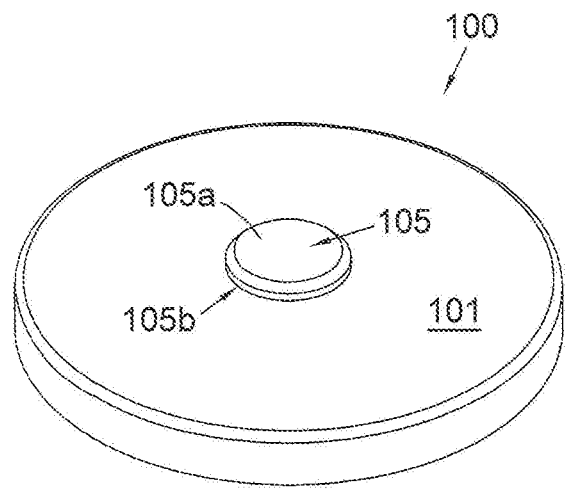
FIG. 10A shows a perspective view of the distal end mount.
Figure 10B:
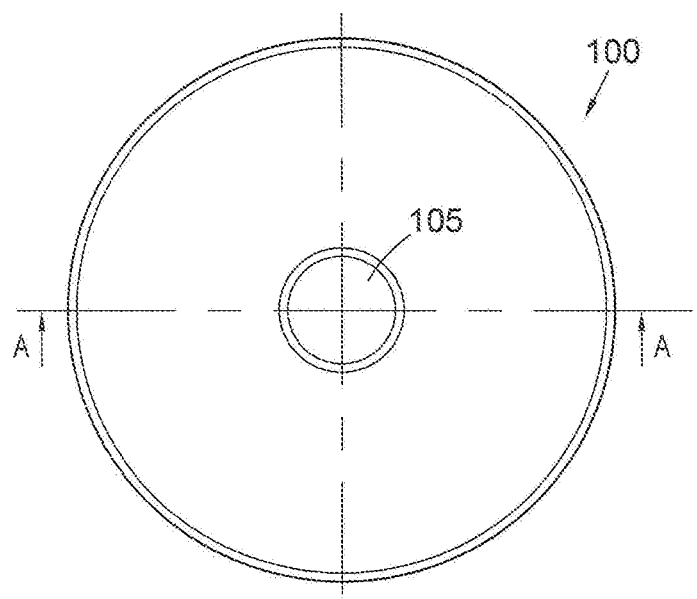
FIG. 10B shows a bottom view of the distal end mount.
Figure 10C:
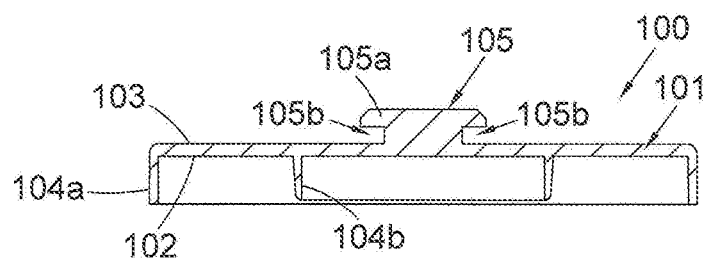
FIG. 10C shows a cross-sectional view of the distal end mount along plane A-A shown in FIG. 10B.
Figure 11:
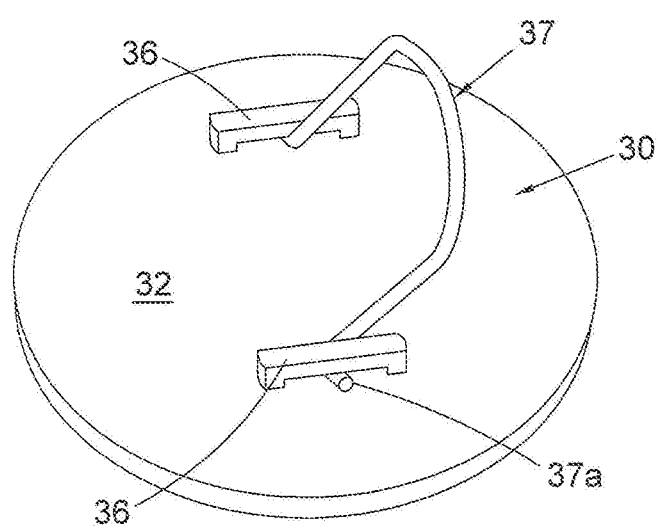
FIG. 11 shows the housing bottom cover.

The distal end mount 100 for the filter element is shown in FIGS. 10A to 10C. The distal end mount 100 is located on the distal end of the carbon block 80 in use. The distal end mount 100 comprises a circular plate portion 101 having a top face 102 for facing towards the carbon block and an opposing bottom face 103. Projecting from the outer perimeter of the top face 102 is an outer annular wall 104a that fits around the proximal end of the carbon block 80. Also projecting from the top face 102 is an inner annular wall 104b that is configured to be received within the opening of the distal open end 83 of the carbon block's bore.

The proximal and distal end mounts 90, 100 are secured to the carbon block 80 by gluing, however it will be understood that they can be secured by other suitably means such as by frictional engagement.

Projecting from the bottom face 103 of the distal end mount 100 is a projecting member 105 which is configured to be used to ease removal of the filter element assembly from the housing (e.g. in order to replace the filter element assembly with a new filter element assembly).

The projecting member 105 is a mushroom type projection comprising a flange portion 105a and an undercut portion 105b between the flange portion 105a and the bottom face 103 of the distal end mount. The undercut portion 105b allows the projecting member to be grasped in order to assist with removal of the filter element assembly from the housing in order to assist with providing sufficient pulling force to overcome the interference fit between the spigot 95 and the spigot recess 26 at the proximal end of the filter element assembly when installed. In this embodiment the projecting member 105 is circular in shape and the undercut portion 105b extends annularly around the projecting member 105, however it will be understood that other shapes may be employed.

The removal tool 70 can be used to assist with removal of the filter element assembly from the housing. The elongate channel 76 has a first channel end 76a at the narrow end 74 of the removal tool 70 and a second channel end 76b at the thick end 75 of the removal tool 60. The first channel end 76a is shaped and sized to hook under the flange portion 105a of the projecting member 105. The user may then grip the removal tool 70 and use it to pull the filter element assembly out of the housing, which would otherwise be difficult to grip. The first channel end 76a has a C-shaped aperture 76c, the C-shaped aperture having a diameter that is smaller than that of the flange portion 105a of the projecting member 105 but larger than the stem of the undercut portion 105b, so that it can be hooked under the flanged projecting member 105 for extraction of the filter element assembly. The mouth of the C-shaped aperture is preferably smaller than the diameter of the C-shaped aperture, but large enough to fit around the stem of the undercut portion 105 of the projecting member. The C-shaped aperture may have a slightly elongated mouth portion 76d.

In operation, in order to replace the filter element assembly from the water filter assembly the locking member 60 is slid by the user out of its locked position. The first pair of protruding members 53 on the circlip 50 are then pinched by the user to move the circlip 50 out of its expanded configuration so that it can be removed from the groove 25 in which it is seated. The removal tool 70 can then be used to pry the housing bottom cover 30 from the housing 20. The filter element assembly can then be accessed from the opening 23 in the housing. The removal tool 70 can be used to pull the filter element assembly from the housing by hooking the removal tool 70 under the projecting member 105 of the distal end mount 100 of the filter element assembly. A new filter element assembly can then be installed in the housing by inserting the proximal end mount into the opening 23 in the housing and rotating the filter element assembly until the spigot 95 autolocates in the spigot recess 26. The user then places the housing bottom cover 30 in the opening 23 in the housing 20 so that it rests in the opening, slightly outwardly from its mounted position. The circlip 50 is then placed in the opening 23 by pinching the first pair of protruding members 53 and placing the circlip slightly outwardly from its retaining position. The user pushes the housing bottom cover 30 into its mounted position either directly or by bearing the protruding members 53, 54 against a surface to push the circlip 50 towards the housing 20 and thereby drive the housing bottom cover 30 into its mounted position. The locking member 60 is then moved into its locked position.

The housing 20, housing bottom cover 30, retaining means 50, and end mounts 90, 100 for the filter element assembly are preferably made of plastic. A preferred plastic material for the plastic parts may be polypropylene, which may optionally be reinforced with talc.

The invention claimed is:

1. A water filter assembly for filtering water, adapted to be coupled to piping of a piped water system, the water filter apparatus comprising:
   a housing having first and second housing ends, the housing having an inlet and an outlet located at the first housing end, the second housing end having an opening, the housing being for removably receiving a filter element assembly through the opening in the second housing end,
   and a housing bottom cover releasably mountable over the opening in the second housing end, wherein the housing bottom cover has a mounted position wherein it is mounted in sealing engagement over the opening in the second housing end, the water filter assembly further comprising retaining means for retaining the housing bottom cover in its mounted position relative to the housing, wherein the retaining means mounts over the housing bottom cover in use so that the housing bottom cover is between the retaining means and the opening in the second housing end when assembled; and wherein the retaining means has an inner side and an outer side opposing the inner side, the housing having a longitudinal axis extending between its first and second ends, the inner side of the retaining means facing towards the first housing end when assembled to the housing, the retaining means comprising at least one protruding member that extends away from the outer side, parallel with the longitudinal axis of the housing; and wherein the retaining means comprises a circlip having two free ends, said at least one protruding member comprising first and second protruding members located at each free end of the circlip such that they extend away from the outer side of the circlip, the at least two protruding members being arranged such that a user can pinch them to compress the circlip.

2. A water filter assembly according to claim 1, wherein the water filter assembly further comprises a filter head adapted to be coupled to the piping of the piped water system and means for removably securing the first housing end to the filter head.

3. A water filter assembly according to claim 1, wherein the housing bottom cover is adapted to be secured to the housing via an interference fit.

4. A water filter assembly according to claim 1, wherein the housing bottom cover has an inner side and an outer side, the inner side facing the housing when assembled thereto, the housing bottom cover comprising an upstanding skirt extending from its inner side.

5. A water filter assembly according to claim 4, wherein the skirt has an internal side and an external side, the external side of the skirt including at least one groove, said at least one groove being adapted to receive an O-ring seal.

6. A water filter assembly according to claim 4, wherein the water filter assembly is adapted such that the housing bottom cover has a mounted position wherein the housing bottom cover is sealed against the housing.

7. A water filter assembly according to claim 6, wherein the housing has an inner wall, the inner wall of the housing including an annular step surface at its second end, the housing bottom cover having an outwardly flanged shoulder, the shoulder of the housing bottom cover engaging the annular step surface on the housing when the housing bottom cover is in its mounted position.

8. A water filter assembly according to claim 1, wherein the circlip is outwardly biased.

9. A water filter assembly according to claim 1, wherein the housing has an inner wall, the inner wall of the housing having an annular groove for receiving the retaining means therein in use.

10. A water filter assembly according to claim 1, wherein the retaining means can be mounted relative to the housing in a mounted position to retain the housing bottom cover to the housing,
  the housing bottom cover having a mounted position wherein it is sealed against the housing,
  the second end of the housing terminating at a terminal edge,
  wherein the water filter assembly is adapted so that the housing bottom cover can be placed in the opening in the second end of the housing and the retaining means placed over it with the at least one protruding member extending proud from the terminal edge of the housing such that the housing bottom cover can be driven into its mounted position by pushing the second end of the water filter assembly against a surface.

11. A water filter assembly according to claim 1, wherein the the circlip has an expanded configuration in which it is retainable in a mounted position relative to the housing, the water filter assembly further comprising a locking member which is moveable between a locked position and an unlocked position, the locking member being located between the two free ends of the circlip when in its locked position in order to maintain the circlip in its expanded configuration.

12. A water filter assembly according to claim 1, the water filter assembly further comprising the filter element assembly, the filter element assembly being removably insertable in the housing through the opening in the second housing end, the filter element assembly comprising a water filter element for filtering water.

13. A water filter assembly according to claim 12, wherein the filter element assembly comprises a proximal end to be arranged at the first end of the housing and a distal end to be arranged at the second end of the housing when installed, the filter element assembly further comprising a proximal end mount which, in use, channels water through the filter element, the proximal end mount having a spigot projecting from it, the housing having a spigot recess inside the housing at its first end for receiving the spigot therein, the spigot recess having an aperture therein which comprises the housing inlet or the housing outlet so that the spigot can be coupled in fluidic communication with the housing inlet or outlet.

14. A water filter assembly according to claim 13, wherein the filter element has a substantially cylindrical outer shape, the filter element having a central longitudinal axis, the spigot projecting along an axis that is offset from the central longitudinal axis of the filter element.

15. A water filter assembly according to claim 12, wherein the filter element assembly comprises a proximal end to be arranged at the first end of the housing and a distal end to be arranged at the second end of the housing when installed, the filter element assembly further comprising a distal end mount mounted on the distal end of the filter element, the distal end mount having an outer side facing away from the filter element, the distal end mount having a projecting member extending from the outer side of the distal end mount.

16. A water filter assembly according to claim 15, wherein the projecting member has an undercut into which a filter element assembly removal tool may be engaged in order to pull out the filter element assembly from the housing.

17. A water filter assembly according to claim 16, wherein the water filter assembly further comprises a filter element assembly removal tool for engaging the undercut of the projecting member in order to pull out the filter element assembly from the housing.

18. A water filter assembly according to claim 1, wherein the retaining means is removably mountable over the housing bottom cover in use, the retaining means being fully removable from the water filter assembly so that the housing bottom cover can be removed from its mounted position over the opening in the second housing end.

* * * * *